US007628296B2

(12) United States Patent
Rudolph

(10) Patent No.: US 7,628,296 B2
(45) Date of Patent: Dec. 8, 2009

(54) METHOD FOR PRODUCING A RECLOSABLE SPOUT ELEMENT AND A CORRESPONDINGLY PRODUCED SPOUT ELEMENT

(75) Inventor: Robert Rudolph, Wettingen (CH)

(73) Assignee: SIG Allcap AG, Neuhausen am Rheinfall (CH)

( * ) Notice: Subject to any disclaimer, the term of this patent is extended or adjusted under 35 U.S.C. 154(b) by 318 days.

(21) Appl. No.: 10/476,086

(22) PCT Filed: May 2, 2002

(86) PCT No.: PCT/EP02/04817

§ 371 (c)(1),
(2), (4) Date: May 13, 2004

(87) PCT Pub. No.: WO02/087982

PCT Pub. Date: Nov. 7, 2002

(65) Prior Publication Data

US 2004/0182890 A1 Sep. 23, 2004

(30) Foreign Application Priority Data

May 2, 2001 (DE) .............................. 101 21 420

(51) Int. Cl.
*B29C 45/16* (2006.01)
(52) U.S. Cl. .................. 222/556; 222/1; 222/541.1; 264/255; 264/328.8; 229/125.04; 229/125.09; 229/125.15; 229/125.3; 220/265

(58) Field of Classification Search ............... 222/1, 222/556, 541.1, 541.6, 541.9; 264/250, 255, 264/259, 267, 269, 274, 271.1, 328.1, 328.7, 264/328.8; 220/265, 270, 825; 229/123.3, 229/125.04, 125.09, 125.15
See application file for complete search history.

(56) References Cited

U.S. PATENT DOCUMENTS

| 3,000,049 | A | | 9/1961 | Terry, Jr. | |
| 4,462,504 | A | | 7/1984 | Roth et al. | |
| 5,381,935 | A | | 1/1995 | Mock | |
| 5,417,350 | A | * | 5/1995 | Koo | 222/556 |
| 6,116,477 | A | * | 9/2000 | Kreiseder et al. | 222/556 |
| 6,554,181 | B1 | | 4/2003 | Dammers et al. | |

FOREIGN PATENT DOCUMENTS

| DE | 25 30 475 A1 | 1/1976 |
| DE | 299 04 248 U1 | 5/1999 |
| DE | 197 57 387 A1 | 6/1999 |
| DE | 198 05 030 A1 | 8/1999 |
| DE | 198 37 581 A1 | 3/2000 |
| GB | 1 511 157 | 5/1978 |
| WO | WO 97/41040 A1 | 11/1997 |
| WO | WO 00/37329 A1 | 6/2000 |

* cited by examiner

*Primary Examiner*—J. Casimer Jacyna
(74) *Attorney, Agent, or Firm*—The Webb Law Firm

(57) ABSTRACT

A method for manufacturing a two-part, reclosable pouring element for a liquid packaging, wherein the pouring element has a base member and a closure lid, wherein said closure lid is hinged on said base member by means of two bearing necks and has an opening to accommodate a tamper-proof closure and wherein said closure lid can be tilted inside the packaging material for opening of the packaging.

7 Claims, 4 Drawing Sheets

METHOD FOR PRODUCING A RECLOSABLE SPOUT ELEMENT AND A CORRESPONDINGLY PRODUCED SPOUT ELEMENT

BACKGROUND OF THE INVENTION

1. Field of the Invention

The invention relates to a method for the manufacture of a two-part reclosable pouring element for a fluid packing, in particular a flat gable composite packing, whereby the pouring element features a basic body and a closure cover, and whereby the closure cover is pivoted by means of two bearing pivots in jointed fashion on the basic body, as well as a pouring element manufactured thereby.

Reclosable pouring elements for parallelepipedic flat gable composite packings are known in a variety of embodiments. They are used predominantly in connection with fluid packings, with refrigerated, refrigerated-sterile, hot, and aseptic fillings.

2. Description of the Related Art

It has already been proposed in connection with the flat gable packings of the aforesaid type that a pouring element be arranged in the packing gable, which is fitted with a basic body and a corresponding closure cover, and with which the packing is simultaneously opened before its first use (DE 198 05 030 A1). In this situation, a predetermined weakening line is provided in the area of the outer PE layer and cardboard layer in order to weaken the gable material, such that, in order to open the packing, a closure cover is pivoted into the packing material, said closure cover being connected by way of a joint to the basic body, and corresponds to the shape of the predetermined weakening line. In order to reclose the packing, the closure cover, designed as a lever, is pivoted back again into its initial position.

Disadvantageous with this known reclosable pouring element is the elaborate manufacture: Basic body and closure cover are manufactured individually by the injection moulding process, and the closure cover is clamped from below into the basic body by means of its lateral bearing pivots. This is time-consuming and costly, and the method of manufacture imposes the condition that the cut-outs for accommodating the bearing pivots may be deformed by the passing movement of the pivots when the closure cover is pushed into the basic body, with the result that the functional performance is impaired, in particular in respect of sealing tightness when the package, once broken open, is reclosed.

The present invention is therefore based on the objective of improving the known method described heretofore for the manufacture of a reclosable pouring element in its entirety, and of obtaining in particular a reliably tight seal between the basic body and the closure cover.

SUMMARY OF THE INVENTION

This object is solved by a method according to the present invention, including the following steps:
Injection moulding of the closure cover from a first plastic;
rotation of the mould about a predetermined angle and the opening of at least one part of the mould body of the closure cover;
closure of a second mould for the basic body, the cavity of which is also formed at least in part by the closure cover;
injection moulding of the basic body from a second plastic; and
opening of the second mould body and removal of the finished pouring element.

The pouring element manufactured according to the invention features, incurred as a condition of manufacture, extremely good sealing tightness. This according ensures that the packing, even once already opened, can be shaken with the pouring element closed again in order to mix the product contained, without any of the product emerging in the process. In a further embodiment of the invention, the closure cover may feature two lateral cavities, in which, during the injection moulding of the basic body, the bearing pivots are formed in-situ; or, as an alternative, it is possible for the closure cover to feature two lateral bearing pivots, which, during the injection moulding of the basic body, are surrounded by them.

As suitable plastics, polyethylene (PE) and polypropylene (PP) may, for example, be used.

According to a further teaching of the invention, the bearing pivots extend in conical fashion towards their free ends. It is also conceivable, however, that the bearing pivots feature corresponding back cuts, in order to allow for a positive-fit (jointed) connection of both construction elements.

A further embodiment of the invention makes provision for the closure cover to feature an aperture, by means of which, during the injection moulding process, a positive-fit connection pertains, which is permanently altered by the closure cover upon its first being opened. In this way, an original design of aperture is created, which makes it possible for the user to see immediately, with a flat gable packing provided with such a reclosable pouring element, whether this has already been opened once or not. This is to be welcomed on grounds of hygiene, as well as from safety considerations, given that poisoned foodstuffs have regrettably been encountered more frequently in recent years.

In a preferred embodiment of the invention, basic body and closure cover are capable of being engaged in the closed position by means of an engagement element designed in the form of a hook or the like, in order to avoid unintentional opening. A perceptible and, for preference, audible engagement provides the user with increased "security" during use.

The engagement element described heretofore may also form the original design of closure element. For this, at the first opening only a part of the original, design of closure element is destroyed, and the remaining non-positive fit connection provides for the desired engagement of the parts.

In a further embodiment of the invention the basic body features at least one web element engaging over the area of its pouring aperture. Such a web element serves not only to stiffen the pouring element, but is also used as a stop, in order to limit the pivot movement of the closure cover at the opening of the package to an angle of about 90°. In this way it will also be clear to a user who has never before used such a pouring element, from the resistance encountered upon reaching the stop, that the opening process has been completed.

DETAILED DESCRIPTION OF PREFERRED EMBODIMENTS

Figure 1:
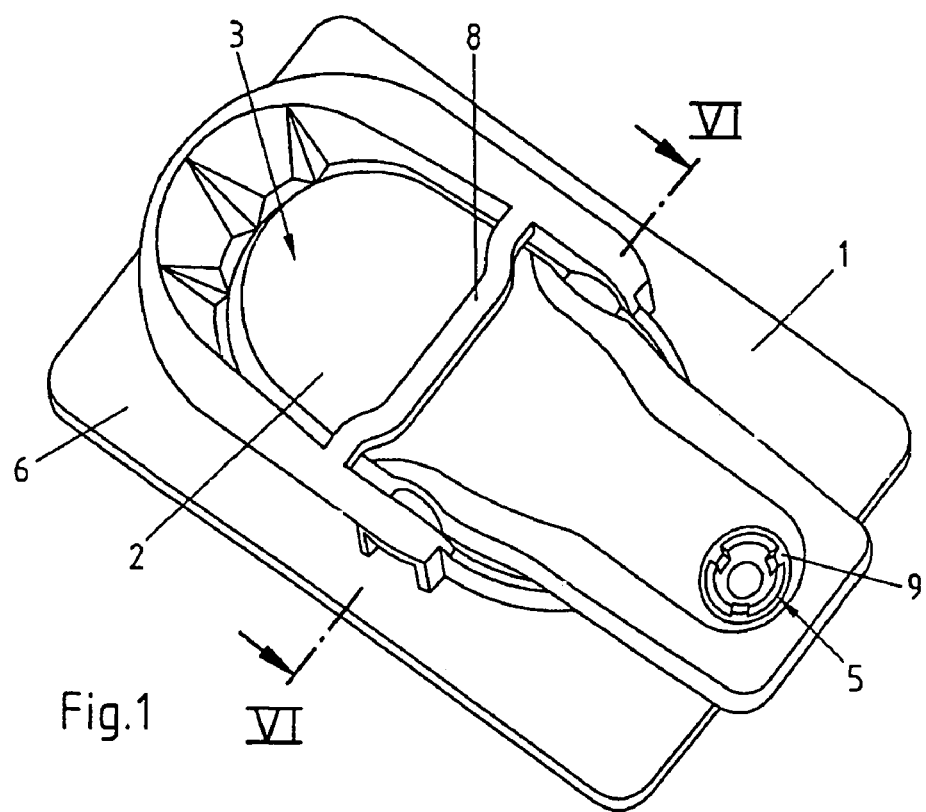
FIG. 1 shows a perspective view of the reclosable pouring element manufactured according to the invention.

In FIG. 1 the pouring element according to the invention is represented in perspective fashion in a plan view. The pouring element features a basic body 1, to be applied to the flat gable packing, not shown, and a closure cover 2 for penetrating the packing wall in a predetermined weakened area of the packing, and subsequent reclosure of the pouring element.

Figure 2:
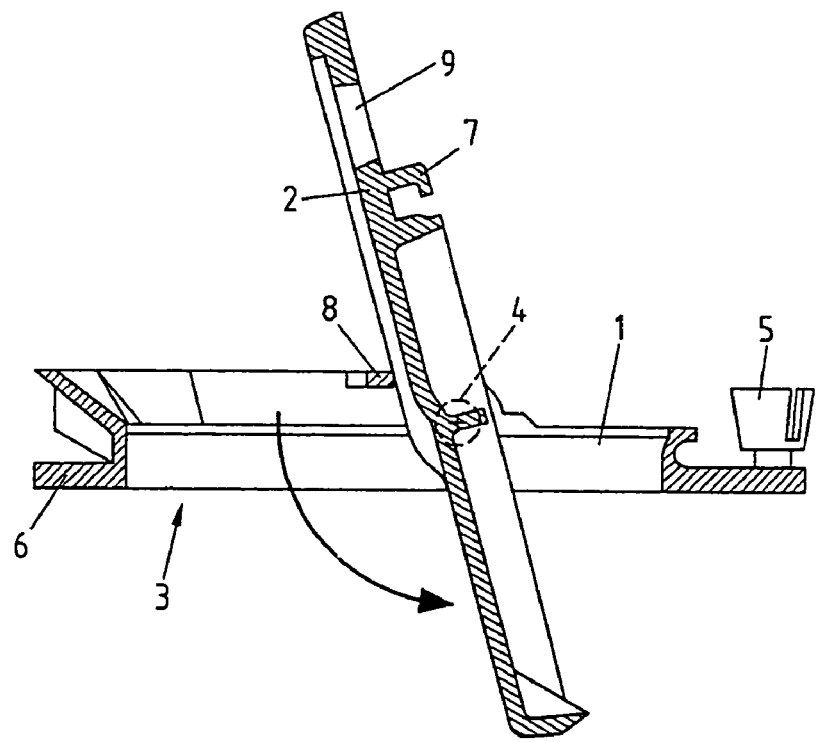
FIG. 2 shows a side view of the pouring element from FIG. 1 in the open position.

As can be seen from FIG. 2 in particular, the closure cover 2 is jointed so as to be capable of pivoting in the basic body 1 of the pouring element about an axis designated as line VI-VI, in order to free a pouring aperture 3. The mounting of the closure cover 2 in the basic body 1 of the pouring element according to the invention is characterised in that the lateral pivots 4 engage from the start of the manufacture of the basic body 1 in corresponding cut-outs in the closure cover 2, and so form a pivot joint. The pivot movement can be clearly seen from FIG. 2, in which the pouring element manufactured according to the invention with opened closure cover 2 is represented in a longitudinal section.

In addition, a closure element 5 of original design can be seen in FIG. 1, which is described in greater detail hereinafter. The basic body 1 features a flange 6, running around the pouring aperture 3, said flange being connected to the surface of the flat gable composite packing (not shown) in the area of the predetermined weakened zone. An engagement element 7 (in FIG. 3) provides for the perceptible (and possibly audible) engagement of the closure cover 2 with the basic body 1 after reclosure. Above the pouring aperture 3 a web element 8 can be identified, linking both sides of the basic body 1, which serves as a stop for the closure cover 2 in the opened position, as can clearly be seen from FIG. 2. At the same time, the web 8 prevents a finger used to assist in the opening process from coming in contact with the product through the pouring aperture 3.

In the preferred embodiment shown, the closure element 5 of original design is arranged on the end of the basic body 1 opposite the pouring aperture 3. In this area, the closure cover 2 features an aperture 9, in which, during injection moulding, a positive-fit connection pertains, which is permanently deformed by the closure cover 2 when the packing is opened for the first time.

Figure 3:
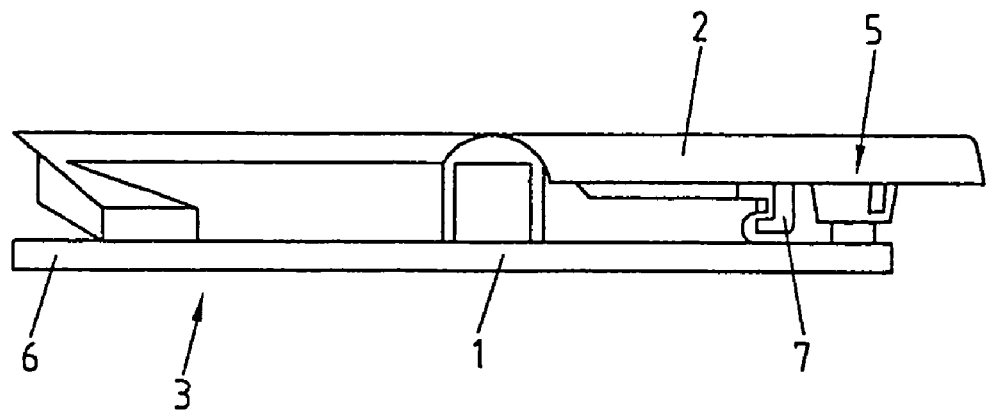
FIG. 3 shows a side view of the pouring element from FIG. 1.

In FIG. 3 the pouring element manufactured according to the invention is represented in a side view. Here can be seen a possible embodiment of the engagement element 7 and of the closure element 5 of original design, as already referred to heretofore.

Figure 4:
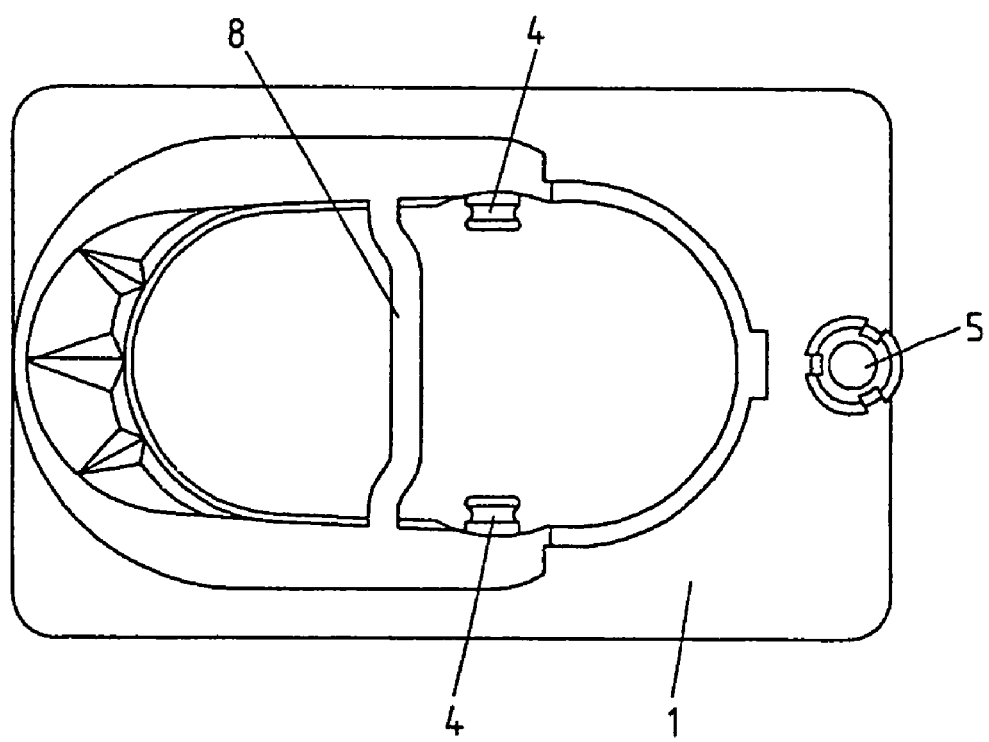
FIG. 4 shows a plan view of a base member of the pouring element according to the invention.

FIG. 4 shows the basic body 1 of the pouring element manufactured according to the invention in a plan view. Here the two bearing pivots 4 can be clearly identified, which are injected into corresponding cavities of the closure cover, not shown for the sake of better understanding.

Figure 5:
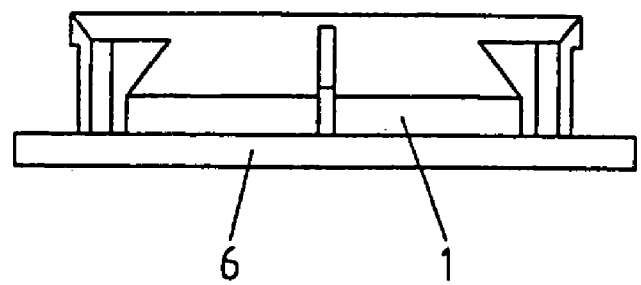
FIG. 5 shows a front view of the pouring element from FIG. 1.
Figure 6:
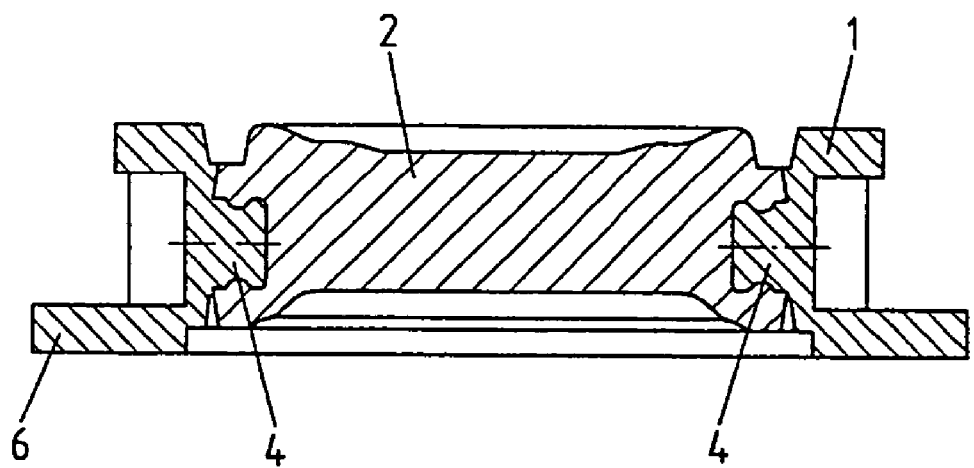
FIG. 6 shows the pouring element from FIG. 1 in a sectional view along the line VI-VI.

FIGS. 5 and 6 show the pouring element manufactured according to the invention in a frontal view and in cross-section along the line VI-VI from FIG. 1. Here it is again clear that, due to the special manufacturing method, a tight positive-fit closure can be achieved between the basic body 1 and the opening element 2. Due to the fact that the basic body 1 still shrinks by a minimal amount during solidification, an optimum sealing tightness us achieved between the two parts.

Figure 7:
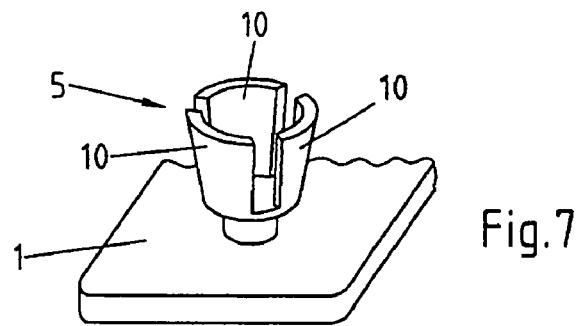
FIG. 7 shows a perspective view of a first exemplary embodiment of a tamper-proof closure applied to the base member without closure lid.
Figure 8:
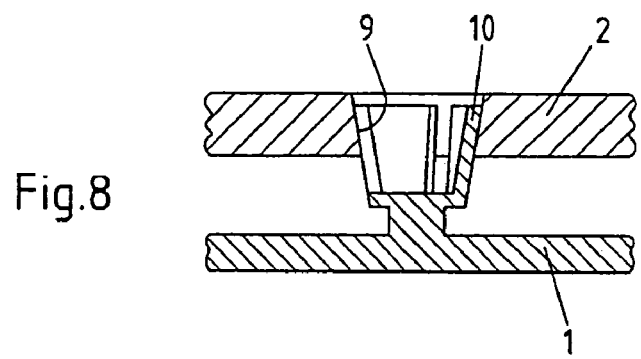
FIG. 8 and FIG. 9 show sectional views of the tamper-proof closure from FIG. 7 in cross-section through the base member and closure lid before and after actuating the closure lid.
Figure 9:
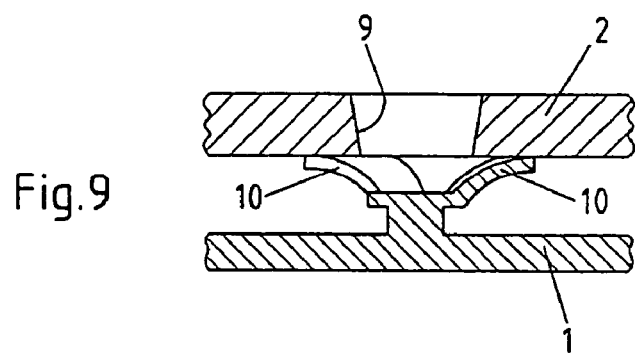

FIG. 7 now shows an embodiment of a closure device 5 of original design in a perspective view, without the basic body. Its function can be derived from FIGS. 8 and 9; in this situation, springs 10, running out of one other in conical fashion, three in number in the embodiment shown and preferred, into the likewise conical shaped aperture 9 of the closure cover 2, so that, at the first reclosure, the springs 10 are bent apart from one another, leading to a permanent deformation.

Figure 10:
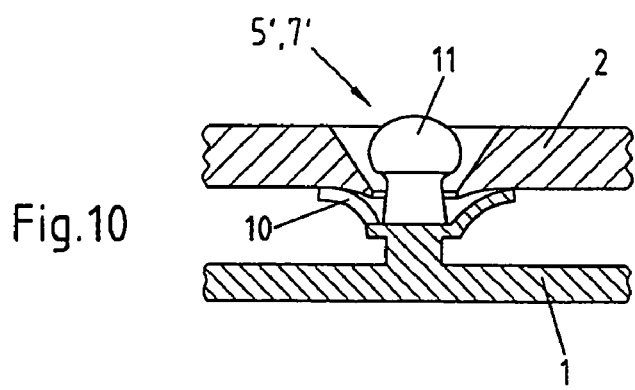
FIG. 10 shows a sectional view of another exemplary embodiment of a tamper-proof closure.

Finally, FIG. 10 shows an alternative embodiment of a closure device of original design, with which, in the interior of the springs 10 already referred to, a mushroom-shaped core 11 is provided, which presents a positive-fit connection with the correspondingly-designed peripheral areas of the aperture 9, in order, in addition to the function of the closure element 5' of original design, also to fulfil the function of an engagement element 7'.

The invention claimed is:

1. A method for manufacturing a two-part, reclosable pouring element for a liquid packaging, wherein the pouring element has a base member and a closure lid, wherein said closure lid is hinged on said base member by means of two bearing necks and has an opening to accommodate a tamper-proof closure and wherein said closure lid can be tilted inside the packaging material for opening of the packaging, the method comprising the steps of:
   a) injection molding said closure lid from a first plastic;
   b) turning the mould by a pre-determined angle and opening at least one part of the mould of said closure lid,
   c) closing a second mould for said base member whose cavity is at least also partly formed by said closure lid,
   d) injection molding of said base member from a second plastic wherein a positive-locking connection is formed in said opening of said closure lid which is permanently modified by said closure lid on opening the packaging for the first time, and
   e) opening the second mould and removing the finished pouring element.

2. The method according to claim 1, wherein said closure lid has two lateral cavities and during injection molding of said base member said bearing necks are formed in situ in said cavities provided in said closure lid.

3. The method according to claim 1, wherein said closure lid has two lateral bearing necks which during injection molding of said base member are surrounded by said base member.

4. The method according to claim 1, wherein said bearing necks extend conically at their free end.

5. The method according to claim 1, wherein the liquid packaging is a flat gable composite packaging.

6. The method according to claim 2, wherein said bearing necks extend conically at their free end.

7. The method according to claim 3, wherein said bearing necks extend conically at their free end.

* * * * *

UNITED STATES PATENT AND TRADEMARK OFFICE
CERTIFICATE OF CORRECTION

PATENT NO. : 7,628,296 B2 Page 1 of 1
APPLICATION NO. : 10/476086
DATED : December 8, 2009
INVENTOR(S) : Robert Rudolph It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Second Day of November, 2010

David J. Kappos
*Director of the United States Patent and Trademark Office*